United States Patent
Oh et al.

(10) Patent No.: US 7,683,924 B2
(45) Date of Patent: Mar. 23, 2010

(54) INTELLIGENT SYSTEM FOR IDENTIFYING VISITOR AND PROVIDING COMMUNICATION SERVICE USING MOBILE TERMINAL AND METHOD THEREOF

(75) Inventors: Yeonjoo Oh, Daejon (KR); Youn-Kwae Jeong, Daejon (KR); Kwang-Roh Park, Daejon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 852 days.

(21) Appl. No.: 11/191,378

(22) Filed: Jul. 28, 2005

(65) Prior Publication Data

US 2006/0063517 A1 Mar. 23, 2006

(30) Foreign Application Priority Data

Sep. 22, 2004 (KR) ............... 10-2004-0076027

(51) Int. Cl.
  *H04N 7/14* (2006.01)
  *H04M 11/00* (2006.01)
(52) U.S. Cl. ............. 348/14.01; 348/14.08; 348/14.02
(58) Field of Classification Search ... 348/14.01–14.16, 348/143, 152, 155; 379/90.01, 93.21, 102.06, 379/93.17
  See application file for complete search history.

(56) References Cited

U.S. PATENT DOCUMENTS 6,094,213 A * 7/2000 Mun et al. ............... 348/14.05

2004/0170262 A1 * 9/2004 Ohno ............... 379/167.12

FOREIGN PATENT DOCUMENTS

| JP | 10-135945 A | 5/1998 |
|---|---|---|
| JP | 2002-300295 A | 10/2002 |
| JP | 2004 248069 | 9/2004 |
| KR | 1020010046483 A | 6/2001 |
| KR | 2001 0108894 | 12/2001 |
| KR | 1020020013646 A | 2/2002 |
| KR | 10-2003 82672 | 10/2003 |
| KR | 10-2004 33187 | 4/2004 |
| KR | 1020050043597 A | 5/2005 |

OTHER PUBLICATIONS

Hong; Remote-Control Entrance Door System and Method; WO 03/028375 A1.*

* cited by examiner

*Primary Examiner*—Melur Ramakrishnaiah
(74) *Attorney, Agent, or Firm*—Ladas & Parry LLP

(57) ABSTRACT

An intelligent system for identifying and communicating to a visitor using a wireless terminal and a method thereof are disclosed. The system includes: a doorphone processor for processing a bell signal event, setting and releasing of a session connection, and processing voice/video data; a terminal recognizer for determining a location of a resident based on a location of a wireless terminal when a bell is activated; a information manager for storing and managing contact addresses of terminals; and a proxy server for requesting a session connection to one of the terminals, selected by the resident, based on the contact addresses, exchanging voice and image of the visitor and voice of the resident between the video doorphone device and the selected terminal through a session channel connected by the resident's allowance of the session connection request, and releasing the session by a request of the selected terminal.

10 Claims, 7 Drawing Sheets

FIG. 3

INTELLIGENT SYSTEM FOR IDENTIFYING VISITOR AND PROVIDING COMMUNICATION SERVICE USING MOBILE TERMINAL AND METHOD THEREOF

FIELD OF THE INVENTION

The present invention relates to an intelligent system for identifying a visitor and providing a communication service by using a mobile terminal and a method thereof; and, more particularly, to an intelligent system for identifying a visitor and providing a communication service by using a wireless communication terminal based on a session initiation protocol (SIP) in a home gateway system.

DESCRIPTION OF RELATED ARTS

Especially, an intelligent system and method according to the present invention determines whether a resident is in home or not in real time when a bell of a video phone connected to a home gateway system is activated by a visitor, notices a visitor's bell activation event to the resident's terminal capable of communication to the intelligent system based on session initiation protocol (SIP) when the resident is not home, and provides a communication service to the resident for identifying a visitor by viewing an image of the visitor and communicating to the visitor.

Herein, a session initiation protocol (SIP) is a simple text based application control protocol to transmit a voice and a video through the Internet based on a standard of internet engineering task force (IETF) where evaluates and publishes international Internet technology standards. Based on the SIP, one or more clients can create a session, modify the session and terminate the session. Such a session includes a teleconference, a telephone, an interviewing, an event noticing, and an instant messaging.

The SIP is independent from low level packet protocols i.e., TCP, UDP, ATM, and X.25. The SIP is based on a client/server structure in which a client creates a call to a server and the server responses to the client's call. Since the SIP follows a conventional text based Internet standards, it is easy to provide a corrective maintenance and a network debug. Also, the SIP standard technology is different from H.323 technology where several communication protocols are jointly used. Therefore, less work load is allocated to a user's personal computer (PC). So, voice and video can be smoothly transmitted or received while performing other jobs in the PC based on the SIP. Furthermore, the SIP provides constant voice quality and supports various Internet based supplementary services regardless of the number of subscribers because a voice and a video message are directly exchanged between subscriber's PCs.

Recently, there is a great interest in a home network system according to popularization of personal computers (PC), development of communication technology and spreading of intelligent household appliances. Accordingly, there are various technologies introduced for developing a home gateway system controlling and managing various household appliances connected with each others to form a home network. According to the home gateway system, the home network is generally formed based on an Internal Protocol (IP) based network, and unique IP address is assigned to each of the household appliances. Based on such a formation of the home network, a user can monitor and control the household appliances by interacting with Internet although the user is not home.

However, studies for controlling the intelligent home appliances and services provided by interacting with the intelligent home appliances are insufficient yet. Especially, there is no development made from a conventional home automation device to identify a visitor. Generally, when a visitor activates a bell of a video phone mounted on a front door or an entrance of a family house, a certain tune is sounded inside a house, and a resident communicates with the visitor through the video phone. Furthermore, a recently introduced home automation system has a function to provide a service to communicate to a guard in a guardroom when a resident is out of home. It is generally used by an apartment resident.

However, the resident cannot be informed by the conventional home automation system such as who was visiting, why, and when the visitor was visiting. Also, the visitor cannot be informed about resident's destination or other possible contact methods from the conventional home automation system.

Moreover, a person having an unlawful thought may use the conventional home automation system to check whether a resident is in home or not by activating a bell of the conventional home automation system. If there is no response, the person turns to a thief and may break into the house.

In order to overcome the above described drawbacks of the conventional technology, there are many conventional technologies introduced.

At first, a door phone system (first conventional system) is introduced in Korea Publication No. 2003-0082672, entitled "door phone system possible communicating with mobile phone of an external". In the first conventional system, a home gateway is directly connected to a wireless communication terminal by equipping a CDMA module in the home gateway for identifying a visitor and communicating with the visitor through the wireless communication terminal by a user.

However, applicable coverage of the first conventional system is limited to the wireless communication terminal because the home gate way in the first conventional system communicates with the wireless communication terminal by embedding a unique number allocated CDMA module in the home gateway. Furthermore, a user must update information of a receiving location of a user's wireless communication terminal before the user leaves home. In other hand, in the present invention, a wireless communication terminal communicates with a home gateway based on Internet protocol (IP) and a home gateway can automatically senses whether a user is in home or not by detecting a location of the wireless communication terminal.

Also, the first conventional system determines whether a user is in home or not after presenting a call signal within a predetermined time. However, in the present invention, it determines whether a user is in home or not through a terminal recognition message between the home gateway and the wireless communication terminal. Furthermore, the first conventional system connects to the wireless communication terminal when nobody responses to the visitor after a bell is activated by a visitor for a predetermined time. However, in the present invention, the home gateway automatically recognizes absence of the resident by detecting a location of user's the wireless communication terminal, and instantly establishes a connection to the wireless communication terminal. Additionally, a user receives a service from the first conventional system only at pre-set location. In the present invention, it is possible to dynamically change a service receiving location. Also, the present invention provides a recording function but there is no such a service provided by the first conventional system.

Meanwhile, another conventional home gateway system (second conventional system) is introduced in Korea Publication, NO. 2001-0108894, entitled "INTELLIGENT DOOR VIDEO PHONE AND REMOTE DOOR OPENING SYSTEM". The second conventional system notices to a user that a visitor visits a house when no one is home, and receives a control from the user at a remote location to open a door through a door videophone.

However, the second conventional system provides only voice communication to limited terminals having telephone numbers pre-stored in a control program transmitting a visit-noticing signal to a wired telephone or a wireless mobile phone by including a call signal receiving unit, a telephone number storing unit and a transmitting unit.

Also, heterogeneous communication networks are used in the second conventional system according to characteristics of terminals. However, in the present invention, there is no additional requirement to communicate between a home gateway and terminals since the terminals and the home gateway are communicated based on the Internet protocol according to the present invention. Furthermore, in the second conventional system, the communication between a home gateway and a user is limited to a pre-set receiving location. That is, the user must stay at the pre-set receiving location for receiving notices of visiting from the home gateway according to the second conventional system. However, a receiving location can be dynamically registered and modified in the present invention. Additionally, the second conventional system determines absence of residents in home after presenting a call signal inside home for a predetermined time. But, in the present invention, the absence of residents in home is instantly determined through a terminal recognition message communication between a home gateway and a wireless communication terminal.

Also, the second conventional system connects to a wireless communication terminal after sounding a door bell to notice the visitor for a predetermined time. But, a home gateway according to the present invention instantly connects to a wireless communication terminal when a visitor visits home by quickly recognizing the absence of the user through recognition of a terminal's location. Furthermore, a service is provided to limited receiving location according to the second conventional system. But, there is no limit of receiving location by dynamically changing the receiving location in the present invention. Moreover, the present invention provides a recording function which is not provided from the second conventional system.

Meanwhile, still another conventional door phone system (third conventional system) is introduced at Korea Publication, NO. 2004-0033187, entitled "APPARATUS AND METHOD FOR DOOR PHONE CALL CONTROL IN-HOME AUTOMATION". The third conventional system provides communication between a visitor and a user through a front door video phone by forming a communication link to a pre-set remote terminal when a resident is not home.

However, in order to use the communication service provided from the third conventional system, a user must set the door phone system to activate a function noticing a visitor and must input information about a remote terminal such as telephone number. If the function is not set, the door phone system according to the third conventional technology takes the time to recognize absence of the user at home because the door phone system recognizes absence of the user after trying to connect to an interphone mounted inside home several times. That is, there is delay generated to connect to the remote terminal.

As described above, services provided from the third conventional system are also limited by the remote terminal and setting function. However, the home gateway according to the present invention provides dynamic services, that is, automatically selecting a most suitable terminal to confirm services and communicate among a wired telephone at home, a wireless communication terminal of a user or an external receiving terminal mounted at outside home, and instantly determining absence of a user.

As described above, the conventional technologies commonly have disadvantages such low reproducibility and inconvenient usage i.e., pre-setting required.

Meanwhile, in order to receive a visitor noticing service to a user's wireless communication terminal, the wireless communication terminal must be capable of packet network based high-speed data communication. A high-speed wireless Internet service in CDMA-2000 1x EV-DO/EV-DV or IMT-2000 is a next generation mobile communication service providing an IP mobility of a terminal. The wireless communication terminal dynamically receives an IP address from a packet data service node (PDSN) to be used as receiving address.

The PDSN is a node dynamically allocating an address to connected wireless communication terminals by preparing a plurality of IP address resources, and performing functions for establishing a PPP connection with the wireless communication terminal and transferring transmitting/receiving packet data. However, an IP address of the wireless communication terminal changed whenever the PDSN allocates an IP address to the wireless communication terminal while the wireless communication terminal is moving. Accordingly, there is a demand for a method for obtaining receiving IP address information of a wireless communication terminal which is dynamically changed.

SUMMARY OF THE INVENTION

It is, therefore, an object of the present invention to provide an intelligent system for identifying a visitor and providing a communication service using a wireless communication terminal by determining a location of a resident in real time at a home gateway system when a visitor activates a bell of a video door phone connected to the home gateway system, noticing a bell activation event to the resident by connecting to a terminal capable of real-time communication such as a wireless communication terminal based on SIP when the resident is not home, and transmitting video signal to identify a visitor by viewing images of the visitor, and a method thereof.

It is another object of the present invention to provide an intelligent system for identifying a visitor using a wireless communication terminal by providing a voice and video communication between a visitor and a resident in order to voice-communicate with the visitor after identifying the visitor by viewing images of the visitor.

It is still another object of the present invention to provide an intelligent system for identifying a visitor by selectively recording an image or a voice of a visitor when a resident is unable to use a real-time identifying and communicating function.

In accordance with an aspect of the present invention, there is provided a system for providing a service identifying a visitor and communicating a visitor, including: a door phone interface and application processing unit connected to a video door phone device for processing a bell signal event, setting and releasing of a session connection, and processing voice/ video data; a terminal recognizing unit for determining whether a resident is home or not by detecting a location of a resident's wireless communication terminal when a bell activation event is occurred; a location information managing unit for storing and managing contact addresses of visitor identifying and communicating terminals; and a visitor identifying and communicating proxy unit for requesting a session connection to one of the visitor identifying and communicating terminals, selected by the resident, based on the contact addresses according to the detected location of the resident by the terminal recognizing means when the bell activation event is occurred, exchanging voice and image of the visitor and voice of the resident between the video door phone device and the selected terminal through a session channel connected by the resident's allowance of the session connection request, and releasing the session by a request of the selected terminal.

In accordance with another aspect of the present invention, there is also provided a method for providing a service identifying and communicating a visitor using a home network, including the steps of: a) at a home gateway device, determining whether a resident is home or not through a message communication between a home gateway and the resident's wireless communication terminal in real time when a bell activation event is occurred by a visitor; b) at the home gateway device, requesting a session connection to one of in-house visitor identifying and communicating terminals, selected by the resident, based on a contact address when the resident is home according to the determination of the step a); c) at the home gateway device, transmitting an image of the visitor from the video door phone to a resident-selected visitor identifying and communicating terminal through a session channel established by the resident's allowance of the session connection request; and d) at the home gateway device, releasing the connected session by a request of the resident-selected visiting identifying and communicating terminal.

The step c) may further include a step of: at the home gateway, transferring voice of the visitor and voice of the resident between the resident-selected visiting identifying and communicating terminal and the video door phone device through the session channel.

In accordance with still another aspect of the present invention, there is also provided a method for providing a service identifying and communicating a visitor using a home network, the method including the steps of: a) at a home gateway device, determining whether a resident is home or not in real time through a message communication between a home gateway and the resident's wireless communication terminal when a bell activation event is occurred by a visitor; b) at the home gateway device, checking whether a contact address of out-house visitor identifying and communicating terminal is registered or not, and requesting a session connection to a contact address of the out-house visitor identifying and communicating terminal or a contact address of the wireless communication terminal when the resident is not home according to the determination of the step a); c) at the home gateway device, transmitting an image of the visitor from the video door phone to a resident-selected terminal between the out-house visitor identifying and communicating terminal and the wireless communication terminal through a session channel established by the resident's allowance of the session connection request; and d) at the home gateway device, releasing the connected session by a request of the resident-selected terminal.

The step c) may further include a step of: at the home gateway, transferring voice of the visitor and voice of the resident between the resident-selected terminal and the video door phone device through the session channel.

The method for providing a service identifying and communicating a visitor using a home network many further include the steps of: e) at the home gateway device, activating a recording function according to a request of the resident-selected terminal; f) at the home gateway device, outputting an announcement recorded according to a recording function setting to the video door phone device when the bell activation event is occurred by the visitor, and receiving and storing voice/image of the visitor from the video door phone device; and g) at the home gateway device, transmitting the stored voice/image of the visitor to the resident-selected terminal by the resident's request.

According to the present invention, a home gateway device determines whether a resident is home or not in real time when a visitor activate a bell of a video door phone connected to the home gateway device, notices the bell activation event to the resident through a wireless communication terminal based on SIP when the resident is not home, provides a real-time voice/video communication service between the resident and the visitor based on RTP, and selectively provides a voice/video recording function to record voice and image of a visitor when a resident is unable to use the visitor identifying and communicating function in order to check the visitor later.

In order to automatically identify a visitor and communicate with the visitor in real time when a resident is not home, the home gateway device automatically senses whether the resident is home or not by detecting a location of the resident's wireless communication terminal. Since a general user always carries around a wireless communication terminal, the location of the user may be detected by detecting the location of the wireless communication terminal. After automatically sensing the location of the resident, a bell activation event is informed based on SIP to the resident's wireless communication terminal or other terminals capable of identifying a visitor and communication with a visitor when the resident is out of home. After informing and establishing a connection between the home gateway device and the wireless communication terminal, a real-time service for identifying a visitor and communicating with the visitor based on RTP is provided through the established connection. In case of unable to use the service, the home gateway device records the visitor's voice message and images selectively. Therefore, the resident can check voice message and image of the visitor later. Herein, the wireless communication terminal dynamically informs changed IP address to the home gateway device when the wireless communication terminal moves between packet data servicing nodes in a next generation mobile communication network such as CDMA1x EV/DV, or IMT-2000 network.

In the present invention, the home gateway device determines that a location of the resident is home through communication with a terminal recognition module in the resident's wireless communication terminal when a door bell is activated by a visitor. Since a general user always carries around a wireless communication terminal, the location of the user may be detected by detecting the location of the wireless communication terminal. After automatically determining that the location of the resident is home, the home gateway device notice the bell activation event to the resident through in-house visitor identifying and communicating terminals such as a Tablet PC, a PDA, a kitchen TV-phone, an IP set-top box, and a Web-pad which are connected to a home network. The resident selects closet one of the in-house visitor identifying and communicating terminals, and may identify the visitor by viewing image of the visitor and voice-communicate with the visitor through the selected in-house visitor identifying and communicating terminal. When the resident is not home, the home gateway device provides the visitor identifying and communicating service to the resident's wireless communication terminal. That is, the present invention provides the visitor identifying and communicating service to a user without spatial limitation. Therefore, the conventional problem of spatial limitation can be eliminated according to the present invention.

In the present invention, images of a visitor is transmitted to the resident's wireless communication terminal based on real-time transport protocol (RTP), and the resident identifies the visitor by viewing the transmitted visitor's images in real-time. However, the visitor only hears the resident's voice. Inhere, the session initiation protocol (SIP) is used to set and release a multimedia communication session between the visitor and the resident. A RFC 1889 RTP/RTCP protocol is used to transfer voice and image of the two users. In the present invention, when the wireless communication terminal moves between packet data servicing nodes in a next generation mobile communication terminal and receives new address from newly connected packet data service node, the wireless communication terminal dynamically informs the newly received IP address to the home gateway device.

Therefore, location information of the wireless communication terminal is dynamically obtained.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, an intelligent system for identifying a visitor and providing a communication service using a wireless communication terminal and a method thereof in accordance with a preferred embodiment of the present invention will be described in more detail with reference to the accompanying drawings.

Figure 1:
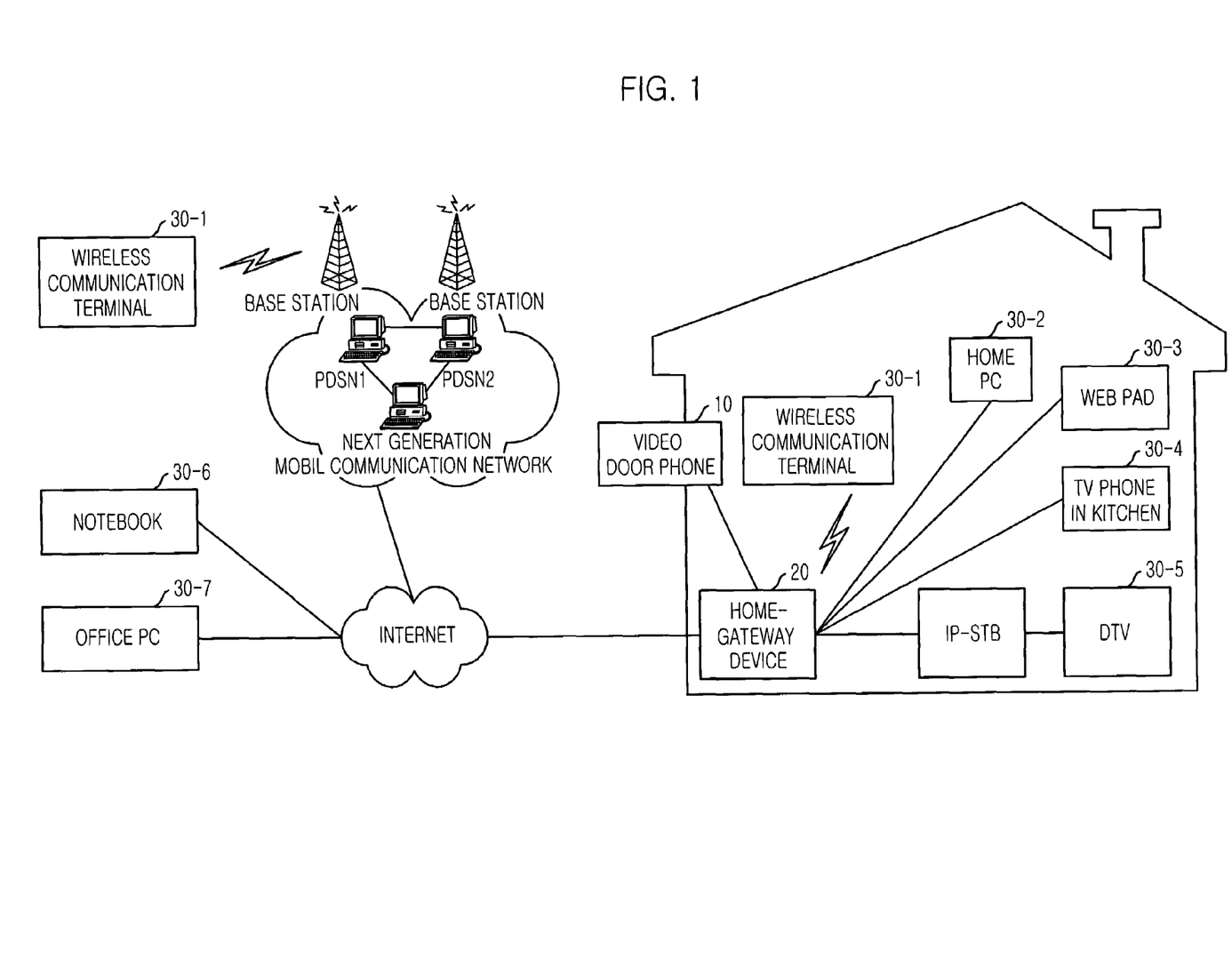
FIG. 1 is a block diagram illustrating a system for identifying a visitor and providing a communication service using a wireless communication terminal in accordance with a referred embodiment of the present invention.

FIG. 1 is a block diagram illustrating a system for identifying a visitor and providing a communication service using a wireless communication terminal in accordance with a preferred embodiment of the present invention. That is, FIG. 1 shows connections of an IP based home network and external networks such as a next generation mobile communication network and a wired/wireless Internet for providing a service of identifying a visitor and a communication service based on a session initiation protocol (SIP) using a home gateway.

A home network, an external network such as Internet and a next generation mobile communication network are connected based on an Internet Protocol (IP) data packet communication.

When a visitor doorbell event is inputted to a video door phone device 10 on the home network, a home gateway device 20 recognizes a location of a resident in real time through communication with a terminal recognition module in the resident's wireless communication terminal 30-1. That is, the home gateway device 20 recognizes whether the resident is in home or not by communicating with the wireless communication terminal in real time. After recognizing, the home gateway device 20 notices the bell activation event through visitor identifying and communicating terminals 30-2 to 30-5 i.e., a tablet PC, a PDA, a kitchen TV-phone, an IP set-top box-DTV, a web-pad. The resident can view images of a visitor and communicate with the visitor in real time by selecting most convenient one of the visitor identifying and communicating terminals. Also, the home gateway device 20 notices the bell activation event to a resident through a wireless communication terminal 30-1 based on SIP for providing a voice communication service with the visitor while viewing images of a visitor based on real-time transport protocol (RTP). When a resident is unavailable to use a visitor identifying and communicating function, the home gateway device 20 records images and voices of the visitor for a resident to identify the visitor later.

Figure 2:
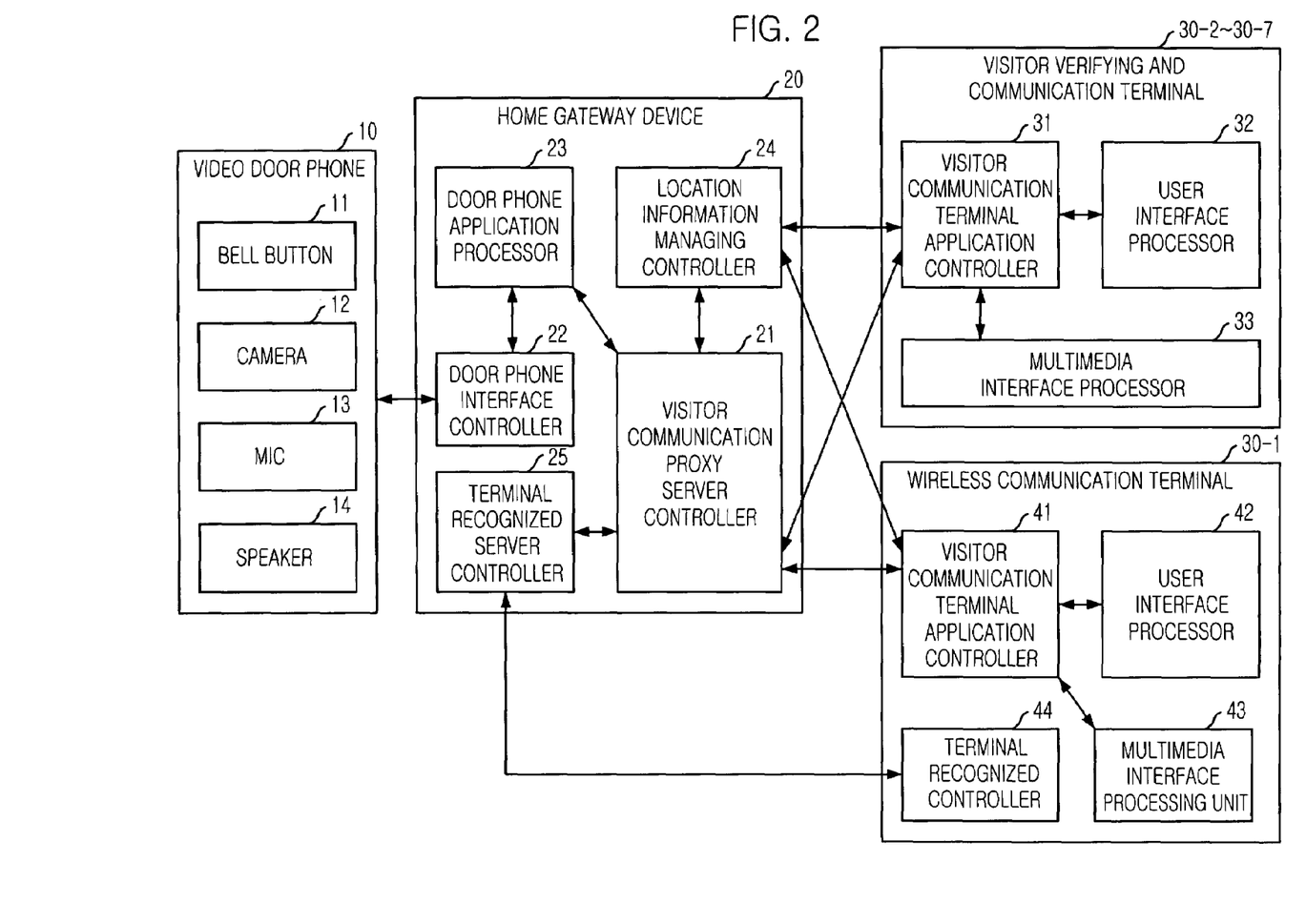
FIG. 2 is a block diagram showing a video door phone device 10, a home gateway device 20 and terminals 30-1 to 30-7 in an intelligent system for identifying a visitor and providing a communication service in accordance with a preferred embodiment of the present invention.

FIG. 2 is a block diagram showing a video door phone device 10, a home gateway device 20 and terminals 30-1 to 30-7 in an intelligent system for identifying a visitor and providing a communication service in accordance with a preferred embodiment of the present invention.

The home gateway device 20 includes: a door phone interface controller 22 and a door phone application processor 23 connected to a video door phone 10 for processing a bell signal event and a voice/image data; a terminal recognition service controller 25 for recognizing a wireless communication terminal 30-1; a location information managing controller 24 for processing, storing and managing a SIP contact address of terminals; and a visitor communication proxy server controller 21 including a SIP proxy function.

Especially, the home gateway device 20 for identifying a visitor and providing a communication service includes: a door phone interface processor 22 and a door phone application processor 23 connected to the video door phone device 10 for processing a bell signal event, a session connection, a session release, and a voice/video data; a terminal recognition server controller 25 for detecting a location of a resident's wireless communication terminal 30-1 when a visitor bell activation event is occurred, and determining whether a resident is in home or not; a location information managing controller 24 for storing and managing contact addresses of visitor identifying and communication terminals 30-1 to 30-7; and a visitor communication proxy server controller 21 for requesting a session connection to one of visitor identifying and communicating terminals 30-1 to 30-7 according to a location of a resident detected by the terminal recognition service controller 25 when the bell activation event is occurred, transferring a visitor's voice and video data and a resident's voice between the video door phone device 10 and the selected visitor identifying and communicating terminal 30-1 to 30-7 through the established session connect when a resident checks that the notification from the home gateway device 20 by using one of the visitor identifying and communicating terminal, and releasing the session in response to a request of the selected visitor identifying and communicating terminal 30-1 to 30-7.

The visitor identifying and communicating terminal 30 includes: a visitor communication terminal application controller 31 for registering and updating a location of a terminal, transmitting/receiving SIP messages, and processing RTP packets; a user interface processor 32 for sensing and processing events inputted from a user, and performing interactions with the visitor communication terminal application controller 31; and a multimedia interface processor 33 for encoding audio data inputted from a microphone, and decoding and reproducing received visitor's voice/video data.

The visitor identifying and communicating terminals 30 may be the wireless communication terminal 30-1, an in-house visitor identifying and communicating terminal capable of identifying and communicating with a visitor in home, i.e., a home PC 30-2, a web-pad 30-3, a kitchen TV phone 30-4, an IP set-top box-DTV 30-5, and an out-house visitor identifying and communication terminal i.e., a office PC 30-7 and a notebook 30-6.

The wireless communication terminal 30-1 includes: a visitor communication application controller 41 for registering and updating location information of a terminal, transmitting and receiving SIP messages, and processing RTP packets; a visitor communication terminal application controller 41 for sensing and processing events inputted from a user; a multimedia interface processor 43 for encoding audio data inputted form a mic, decoding outputting received audio/video data of a visitor, and outputting the decoded data to a reproducing device; and a terminal recognition controller 44 for processing a terminal recognition request message from the terminal recognition server controller 25 of the home gateway device 20.

Figure 3:
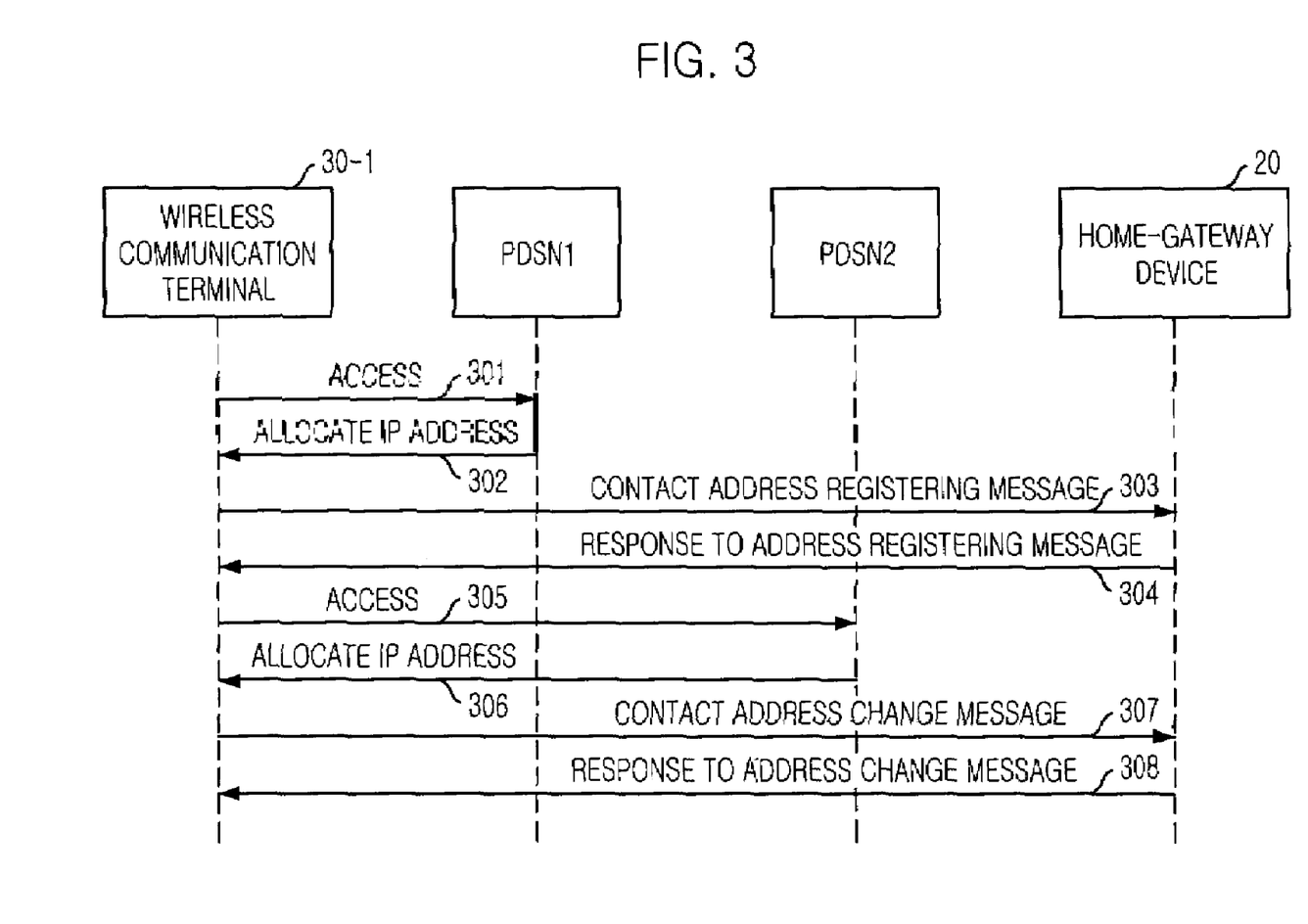
FIG. 3 is a flowchart showing dynamic updating location information of a wireless communication terminal in a method for identifying a visitor and providing a communication service in accordance with a preferred embodiment of the present invention.

FIG. 3 is a flowchart showing dynamic updating location information of a wireless communication terminal in a method for identifying a visitor and providing a communication service in accordance with a preferred embodiment of the present invention. That is, FIG. 3 shown that the wireless communication terminal 30-1 dynamically updates and modifies terminal contact address information at the home gateway device 20.

At first, the wireless communication terminal 30-1 connects to a corresponding packet data serving node 1 (PDSN1) through a base station and a base station controller at step S301. The corresponding packet data serving node 1 (PDSN1) allocates one of IP addresses to the connected wireless communication terminal 30-1 at step S302.

After allocating the IP address, the wireless communication terminal 30-1 transmits a request message (contact address registering message) to register the allocated IP address as a contact address of own to the home gateway device 20 at step S303. The home gateway device 20 registers the contact address of the wireless communication terminal 30-1, and transmits a response message to the wireless communication terminal 30-1 at step S304.

Meanwhile, when the wireless communication terminal 30-1 moves to an area covered by another data packet serving node 2 (PDSN 2), the wireless communication terminal 30-1 is connected to the PDSN2 at step S305. The PDSN 2 allocates another IP address to the wireless communication terminal 30-1 at step S306. After receiving the new IP address, the wireless communication terminal 30-1 transmits a contact address update request message (SIP REGISTER: update) to the home gateway device 20 by putting the new IP address in the contact address update request message at step S307. And, the home gateway device 20 changes the contact address of the wireless communication terminal 30-1 and transmits a response message to the wireless communication terminal 30-1 at step S308.

Figure 4:
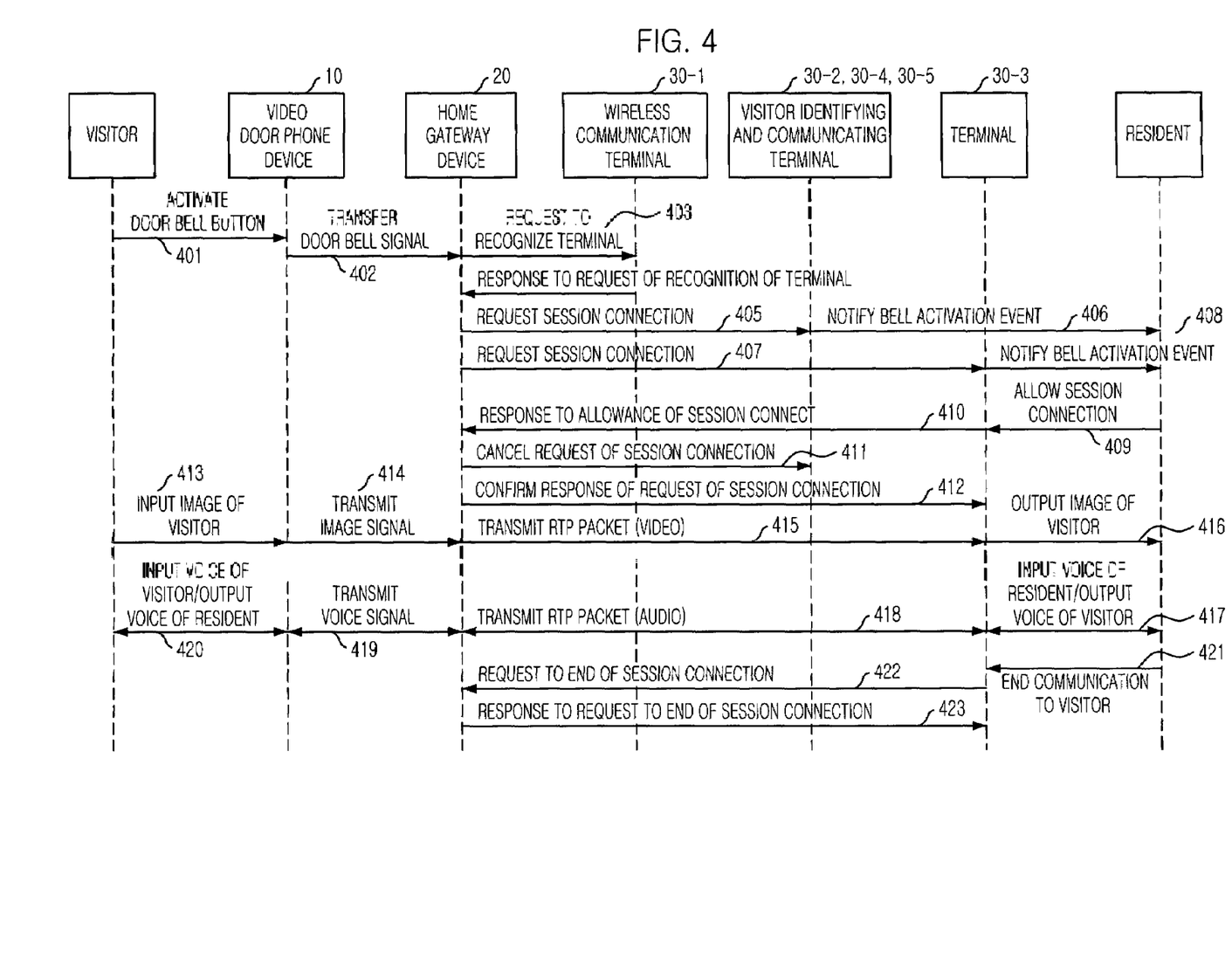
FIG. 4 is a flowchart showing a method for identifying a visitor and providing a real-time communication service when a resident is home in accordance with a preferred embodiment of the present invention.

FIG. 4 is a flowchart showing a method for identifying a visitor and providing a real-time communication service when a resident is home in accordance with a preferred embodiment of the present invention.

Referring to FIG. 4, when a visitor activates a bell connected to the video door phone device 10 at step S401, the video door phone device 10 transfers a doorbell signal to the home gateway device 200 at step S402. The door phone interface controller 22 of the home gateway device 20 receives the doorbell signal, and informs a visitor bell activation event to the door phone application processor 23. Then, the door phone application processor 23 generates a SIP INVITE message, and transmits the SIP INVITE message to a visitor communication proxy server controller 21. After receiving the SIP INVITE message, the visitor communication proxy server controller 21 requests the terminal recognition server controller 25 to search a location of the wireless communication terminal 30-1.

After then, the terminal recognition server controller 25 transmits the terminal recognition request message to the wireless communication terminal 30-1 at step S403. The terminal recognition controller 44 of the wireless communication terminal 30-1 receives the terminal recognition request message, and transmits a terminal recognition response message to the home gateway device at step S404.

After receiving the terminal recognition response message, the terminal recognition server controller 25 of the home gateway device 20 informs a success of wireless communication terminal recognition to the visitor communication proxy server controller 21, and the visitor communication proxy server controller 21 requests a contact list of the visitor identifying and communicating terminals 30 to the location information managing controller 24. As a result of the request, the visitor communication proxy server controller 21 receives the contact list, extracts a list of in-house visitor identifying and communicating terminals 30-2 to 30-5 from the contact list, and simultaneously transmits a session connect request message (SIP INVITE message) to all of the in-house visitor identifying and communicating terminals at steps S405 and S407.

The visitor communication terminal application controller 31 of the in-house visitor identifying and communicating terminals 30-2 to 30-5 receiving the SIP INVITE message notices the session connection request message (SIP INVITE message) to a resident at steps 406 and 408.

When the resident allows a visitor communicating connection through the user interface processor 32 of closest one of the in-house visitor identifying and communicating terminals 30-2 to 30-5 at step S409, the visitor communication terminal application controller 31 transmits an allowance response message (SIP 200 OK) to the home gateway device 20 at step S410.

The home gateway device 20 transmits a response message (SIP ACK message) to the terminal 30-3, which is the closet terminal transmitting SIP 200 OK message, at step S412, and transmits a SIP CANCEL message to other in-house visitor identifying and communicating terminals at step S411. A multimedia session channel between the visitor communication terminal application controller 31 of the terminal 30-3 transmitting the SIP 200 OK message and the door phone application processor 23 of the home gateway device 20 is established.

After establishing the multimedia session connection, the door phone interface controller 42 of the home gateway device 20 receives an image of the visitor from the front video door phone device 10 at step s414. The received image data is encoded, and the encoded data is outputted to the door phone application processor 23. The door phone application processor 23 transforms the encoded data to a RTP packet and transmits the RTP packet to the in-house visitor identifying and communicating terminal 30-3 at step S415. The visitor communication terminal application controller 31 of the in-house visitor identifying and communicating terminal 30-3 transfers video data to the multimedia interface processor 33, and the multimedia interface processor 33 decodes and outputs the received video data at step S416.

The multimedia interface processor 33 of the in-house visitor identifying and communicating terminal 30-3 receives voices of a resident at step S417, and transfers the voice to the visitor communication terminal application controller 31 after encoding. The visitor communication terminal application controller 31 converts the voice to a RTP packet and transmits the RTP packet to the home gateway device 20 at step S418. The door phone application processor 23 of the home gateway device 20 separates voice data from the received RTP packet, and transfers the voice data to the door phone interface controller 22. The door phone interface controller 22 decodes the voice data and transfers the decoded data as a voice signal to the video door phone device 10 at step S419. The video door phone device 10 output the voice signal to the visitor at step S420.

Herein, voice data inputted from the visitor is transferred to the resident by reversely performing same steps of transferring the voice data such as S420→S419→S428→S417.

Meanwhile, when the resident generates a termination event after identifying the visitor by viewing the image of the visitor and communicating with the visitor at step S421, the user interface processor 32 of the in-house visitor identifying and communicating terminal 30-3 informs an session termination event to the visitor communication terminal application controller 31. The visitor communication terminal application controller 31 generates a session termination request message (SIP BYE), and transmits the SIP BYE message to the home gateway device 20 at step S422. The door phone application processor 23 of the home gateway device 20 receives the SIP BYE message, and transmits a response message (SIP 200 OK) to the in-house visitor identifying and communicating terminal at step S423. That is, the session for identifying a visitor and providing a communication service between the visitor and the resident is terminated.

Figure 5:
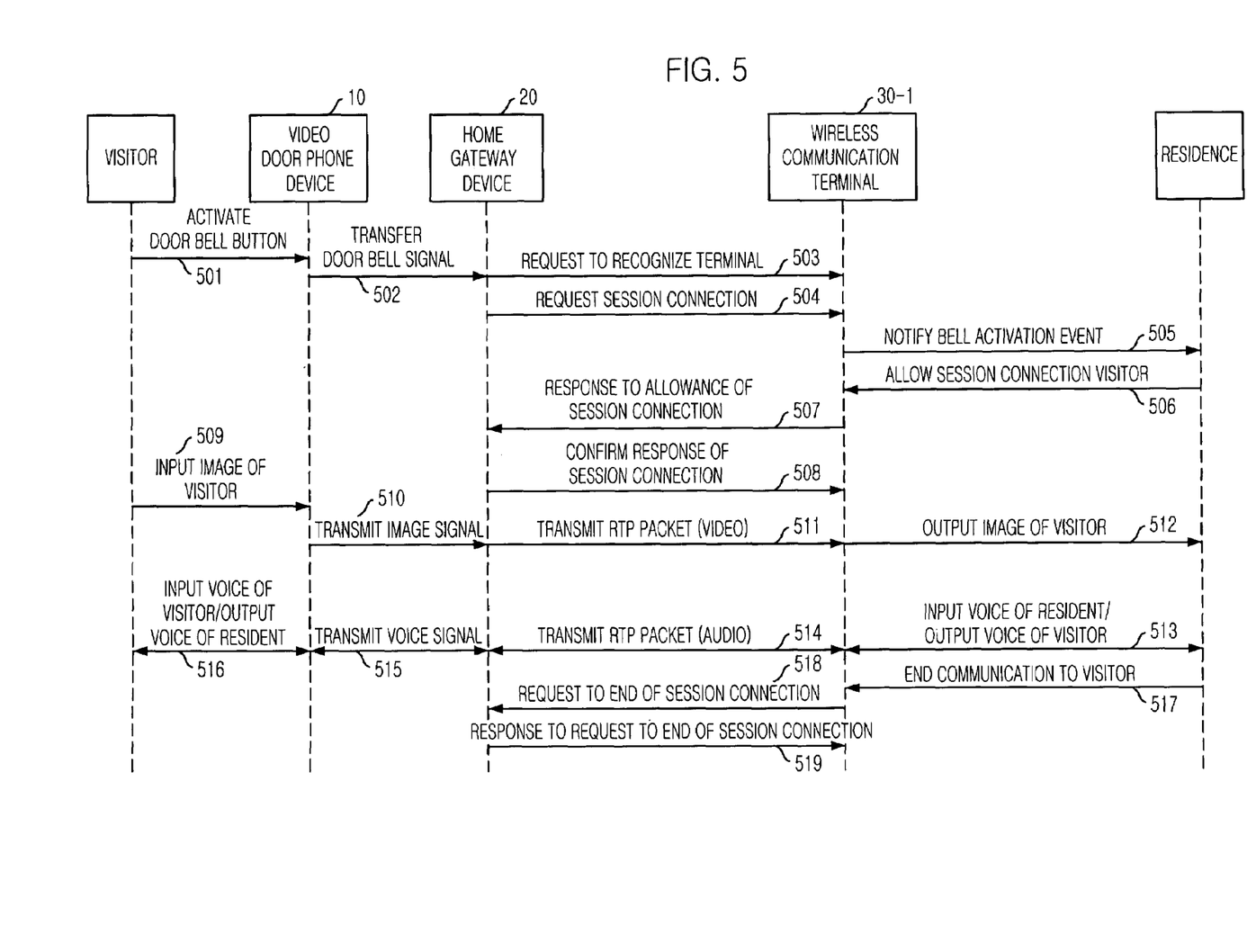
FIG. 5 is a flowchart showing a method for identifying a visitor and providing a communication service using wireless communication terminal when a resident is not home without registering location information of visitor identifying and communication terminals in accordance with a preferred embodiment of the present invention.

FIG. 5 is a flowchart showing a method for identifying a visitor and providing a communication service using wireless communication terminal when a resident is not home without registering location information of visitor identifying and communication terminals in accordance with a preferred embodiment of the present invention.

Referring to FIG. 5, when a visitor activates a bell of the video door phone device 10 at step S501, the video door phone device 10 transmits a door bell signal to the home gateway device 10 at step S502. The door phone interface controller 22 of the home gateway device 20 informs a bell activation event to the door phone application processor 23. The door phone application processor 23 generates a SIP INVITE message and transmits the SIP INVITE message to the visitor communication proxy server controller 21. The visitor communication proxy server controller 21 requests the terminal recognition server controller 25 to search a location of the wireless communication terminal 30-1. And then, the terminal recognition server controller 25 transmits a terminal recognition request message to the wireless communication terminal 30-1 at step S503. After transmitting the request message, if the terminal recognition server controller 25 does not receive a response from the wireless communication terminal 30-1, the terminal recognition server controller 25 informs a failure of terminal recognition to the visitor communication proxy server controller 21. After then, the visitor communication proxy server controller 21 decides that no one is home. After deciding, the visitor communication proxy server controller 21 searches contact address information of the visitor identifying and communication terminals 30-6 and 30-7. If there is no registered visitor identifying and communicating terminals, the visitor communication proxy server controller 21 transmits a session connection request message (SIP INVITE message) to corresponding contact address of the wireless communication terminal 30-1 by using contact address information of the wireless communication terminal 30-1 at step S504.

The visitor communication application controller 41 of the wireless communication terminal 30-1 informs the bell activation event to the resident through the user interface processor 42 at step S505.

When the resident allows a visitor communicating connection through the user interface processor 42 at step S506, the visitor communication terminal application controller 41 transmits an allowance response message (SIP 200 OK) as a response of the session connection request message to the home gateway device 20 at step S507. The home gateway device 20 transmits a response confirmation message (SIP ACK message) to the wireless communication terminal 30-1 at step S508. A session channel connection between the visitor communication terminal application controller 41 of the wireless communication terminal 30-1 and the door phone application processor 23 of the home gateway device 20 is established.

After establishing the session channel communication connection, the video door phone device 10 transmits an image of a visitor (509) to the door phone interface controller 22 of the home gateway device 10. The door phone interface controller 22 encodes the received video data, and transmits the encoded video data to the door phone application processor 23. The door phone interface controller 22 converts the video data to RTP packet and transmits the RTP packet to the wireless communication terminal 20-1 at step S511. The visitor communication terminal application controller 41 of the wireless communication terminal 30-1 transfers video data portion to the multimedia interface processor 43, and the multimedia interface processor 43 decodes and outputs the corresponding video data at step S512.

Also, the multimedia interface processor 43 of the wireless communication terminal 30-1 receives a voice of the resident at step S513, and transmits the received voice to the visitor communication terminal application controller 41 after encoding. The visitor communication terminal application controller 41 converts the received voice data to RTP packet and transmits the RTP packet to the home gateway device 23 at step S514. The door phone processor 23 of the home gateway device 20 separates audio data from the RTP packet, and transmits the separated audio data to the door phone interface controller 22. The door phone interface controller 22 decodes the audio data, and transfers the decoded audio data as audio signal to the video door phone device 10 at step S515. And then, the audio signal is outputted to the visitor at step S516.

Herein, transferring voice data inputted from the visitor to the resident is progressed as reverse order of transmitting voice data from the resident to the visitor (S516→S515→S514→S513).

Meanwhile, the resident generates a termination event after identifying a visitor and voice communicating at step S517. After receiving, the user interface processor 42 of the wireless communication terminal 30-1 informs the session termination event to the visitor communication terminal application controller 41. The visitor communication application controller 41 generates a SIP BYE message for the session termination request message, and transmits the SIP BYE message to the home gateway device 20 at step S518. The door phone application controller 23 of the home gateway device 20 transmits a response message (SIP 200 OK) as a response of the session termination request to the wireless communication terminal 30-1 at step S519. That is, the session for confirming a visitor's image and providing a voice communication is terminated.

Figure 6:
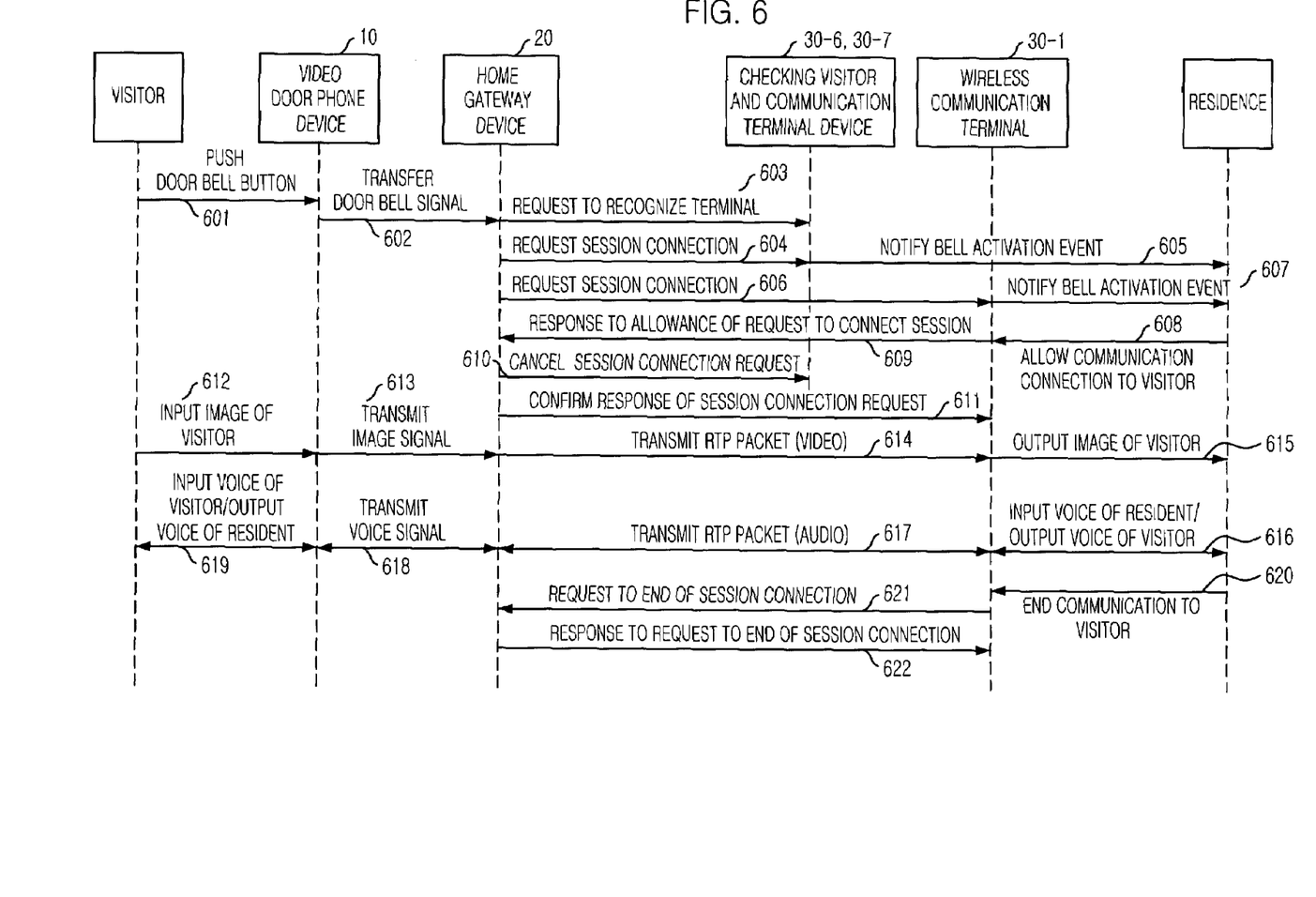
FIG. 6 is a flowchart of a method for identifying a visitor and providing a communication service using a wireless communication terminal when a resident is not home with registering location information of visitor identifying and communicating terminals in accordance with a preferred embodiment of the present invention.

FIG. 6 is a flowchart of a method for identifying a visitor and providing a communication service using a wireless communication terminal when a resident is not home with registering location information of visitor identifying and communicating terminals in accordance with a preferred embodiment of the present invention.

Referring to FIG. 6, when a visitor activates a bell of a video door phone device 10 at step S601, the video door phone device 10 transmits a door bell signal to the home gateway device 22 at step S602. The door phone interface controller 22 of the home gateway device 20 informs a bell activation event to the door phone application processor 23. The door phone application processor 23 generates a SIP INVITE message, and transmits the SIP INVITE message to a visitor communication proxy server controller 21. The visitor communication proxy server controller 21 requests the terminal recognition server controller 25 to search a location of the wireless communication terminal 30-1. The terminal recognition server controller 25 transmits a terminal recognition request message to the wireless communication terminal 30-1 at step S603. After transmitting, if the terminal recognition server controller 25 does not receive any response from the wireless communication terminal 30-1, the terminal recognition server controller 25 informs failure of terminal recognition to the visitor communication proxy server controller 21. The visitor communication proxy server 21 decides that the resident is not home. After deciding, the visitor communication proxy server 21 searches contact address information of visitor identifying and communicating terminals 30-6 and 30-7, and simultaneously transmits a session connection request message (SIP INVITE message) to corresponding visiting identifying and communicating terminals by using the contact address information of the corresponding terminals and the wireless communication terminal 30-1 at step S604 and S606.

After receiving the session connection request message, the visitor communication terminal application controllers 31 and 41 of the visitor identifying and communicating terminals 30-6, 30-7 and the wireless communication terminal 30-1 notice the session connection request message to the resident through the user interface processors 32 and 42 at step S605 and S607.

If the resident wants to use the wireless communication terminal 30-1, the resident allows a visitor communication connection through the user interface processor 42 of the wireless communication terminal 30-1 at step S608. Then, the visitor communication application controller 41 generates an allowance response message (SIP 200 OK) to allow the session connection request and transmits the generated allowance response message (SIP 200 OK) to the home gateway device 20 at step S609.

After receiving the allowance response message, the home gateway device 20 transmits a session connection cancellation message (SIP CANCEL message) to the visitor identifying and communicating terminals 30-6 and 30-7 at step S610, and transmits a response confirmation message to the wireless communication terminal 30-1 at step S611. A multimedia session channel between the visitor communication terminal application controller 41 of the wireless communication terminal transmitting the SIP 200 OK message and the door phone application controller 23 of the home gateway device 20 is established.

After establishing the multimedia session channel, the video door phone device 10 transmits images of the visitor to the door phone interface controller 22 of the home gate device 20 at step S612 and S613. The door phone interface controller 22 encodes the received image data, and transmits the encoded data to the door phone application processor 23. The door phone application processor 23 converts the encoded data to RTP packet, and transmits the RTP packet to the wireless communication terminal 30-1 at step S614. The visitor communication terminal application controller 41 of the wireless communication terminal 30-1 receives the RTP packet, and transfers image data portion of the RTP packet to the multimedia interface processor 43. The multimedia interface processor 43 decodes the image data, and outputs the decode data at step S615.

Also, the multimedia interface processor 43 of the wireless communication terminal 30-1 receives voices of the resident at step S616, and transfers the voices of the resident to the visitor communication terminal application controller 41 after encoding. The visitor communication terminal application controller 41 converts the encoded voice data to RTP packets, and transmits the RTP packets to the home gateway device 20 at step S617. The door phone application processor 23 of the home gateway device 20 receives the RTP packets, separates voice data from the RTP packet, and transfers the voice data to the door phone interface controller 22. The door phone interface controller 22 decodes the voice data to a voice signal, and transfers the voice signal to the video door phone device 10 at step S618. The video door phone device 10 outputs the voice of the resident to the visitor at step S619.

Herein, transmitting voice data inputted from the visitor to the resident is progressed by reversely performing the above described steps for transmitting the voice data from the resident to the visitor (S619→S618→S617→S616).

Meanwhile, the resident activates a termination event after identifying the visitor by viewing the image of the visitor and communicating with the visitor at step S620. The user interface processor 42 of the wireless communication terminal 30-1 receives the termination event, and informs a session termination event to the visitor communication terminal application controller 41. The visitor communication terminal application controller 41 generates a session termination request message (SIP BYE) to request to terminate the session, and transmits the session termination request message (SIP BYE) to the home gateway device 20 at step S621. The door phone application processor 23 of the home gateway device 20 receives the session termination request message (SIP BY), and transmits a session termination response message (SIP 200 OK) to the wireless communication terminal 30-1 at step S622. Accordingly, the multimedia session between the visitor and the resident for identifying visitor's image and communicating with the visitor is terminated.

Figure 7:
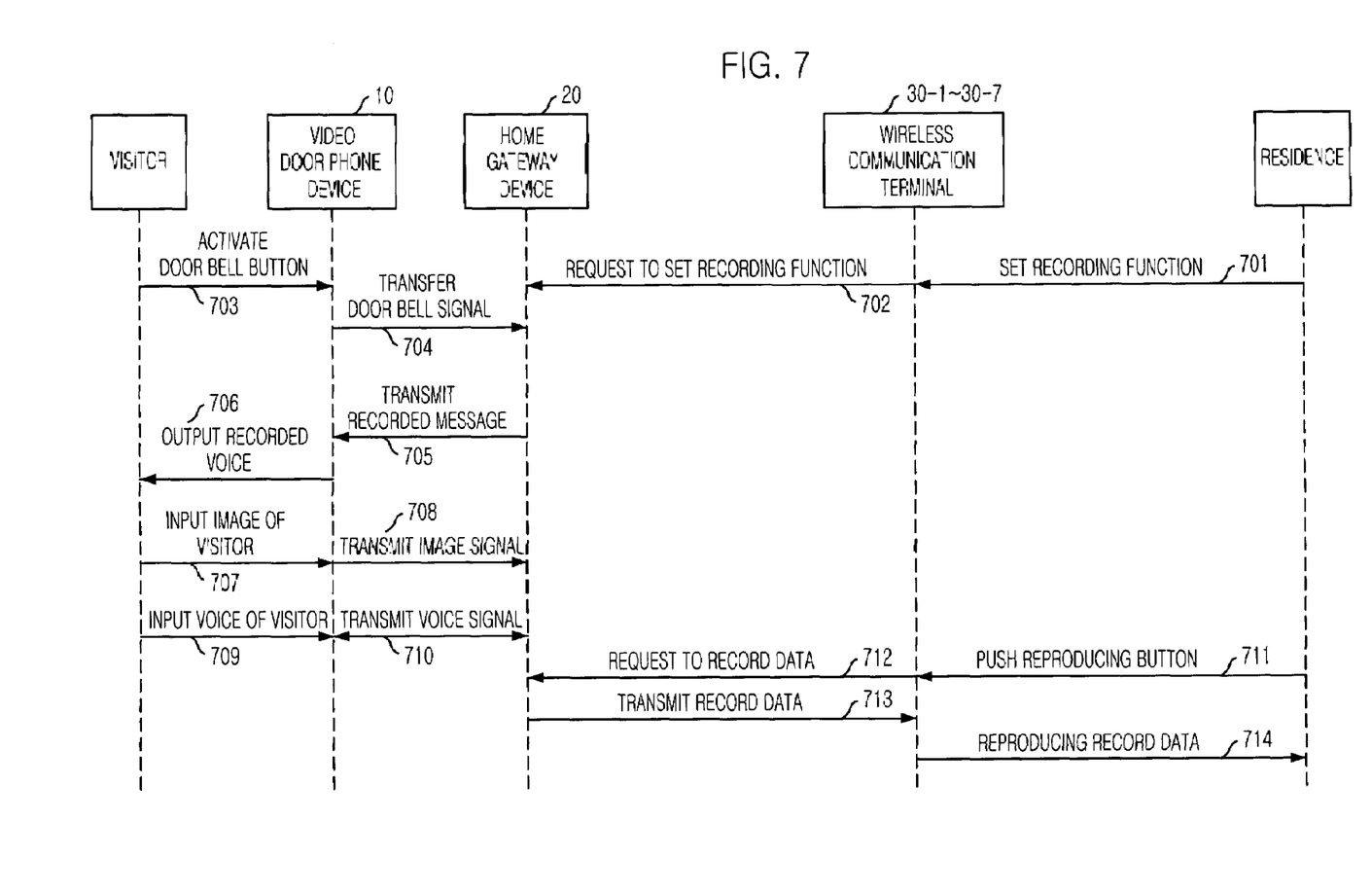
FIG. 7 is a flowchart of a method for setting a recoding function and reproducing in order to identify a visitor and provide a communication service using a wireless communication terminal in accordance with a preferred embodiment of the present invention.

FIG. 7 is a flowchart of a method for setting a recoding function and reproducing in order to identify a visitor and provide a communication service using a wireless communication terminal in accordance with a preferred embodiment of the present invention.

Referring to FIG. 7, the resident selects one terminal among visitor identifying and communicating terminals 30-1 to 20-7, and sets a recording function of the selected terminal through the user interface processor 32 or 42 at step S601. The visitor communication terminal application controller 31 or 41 of the selected terminal receives the recording function setting event, and transmits a recording function setting request message to the home gateway device 20 at step S702. The communication proxy server controller 21 of the home gateway device 20 receives the recording function setting request message, and transfers the recording function setting request message to the door phone application processor 23. The door phone application processor 23 stores recording function activating information.

After setting the recording function, if a visitor activates a bell of the video door phone device 10 at step S704, the video door phone device 10 transfers a door bell signal to the home gateway device 20 at step S704. The door phone interface controller 22 receives the door bell signal, and informs a bell activation event to the door phone application processor 23. The door phone application processor 23 of the home gateway device 20 outputs a recoded guide message according to the recording function setting to the visitor through the video door phone device 10 at steps 705 and 706.

The video door phone device 10 receives voice and images of the visitor at step S707 and S709, and transmits voice and image data to the home gateway device 20. The home gateway device 10 receives the voice and image data from the video phone device 10 at step S708 and S710, and stores the voice and image data.

When the resident selects one of the visitor identifying and communicating terminals 30-1 to 30-7 and activates a reproduce button of recorded visitor's voice and image through the user interface processor 32 or 42 of the selected terminal at step S711, the visitor communication terminal application processor 31 or 41 transmits a recorded data request message to the home gateway device 20 at step S712. The door phone application processor 23 of the home gateway device 20 receives the recorded data request message, and transmits the stored recorded data (RTP packet) to the corresponding one of the visitor identifying and communicating terminals 30-1 to 30-7 at step S713. The visitor communication terminal application controller 31 or 41 of the selected terminal receives the recorded data, and outputs the recorded video/voice data to the resident through the multimedia interface processor 33 or 43 at step S714.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, Internet based service for identifying a visitor and communicating with the visitor through a home gateway device is provided to a resident without spatial limitation according to the present invention. Therefore, a resident can identify a visitor and communicate with the visitor by using a wireless communication terminal without limitation of the resident's location (home or out of home).

According to the present invention, the home gateway device automatically senses a location of the resident (home or out of home) through the terminal recognition message with the wireless communication terminal, and instantly notices that the visitor activates a bell of the video door phone to the resident through the visitor identifying and communicating terminals. Therefore, a service providing area is optimized and usability of service is maximized according to the present invention.

Furthermore, the visitor only hears voice of the resident according to the present invention. Accordingly, the visitor is unable to recognize where the resident is (home or out of home). Therefore, the present invention may protect the resident's properties from criminal activity.

The present application contains subject matter related to Korean patent application No. KR 2004-0076027, filed with the Korean patent office on Sep. 22, 2004, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A system for providing a service identifying a visitor and communicating a visitor, comprising:

a door phone interface and application processing means connected to a video door phone device for processing a bell signal event, setting and releasing of a session connection, and processing voice/video data;

a terminal recognizing means for determining whether a resident is home or not by detecting a location of a resident's wireless communication terminal when a bell activation event is occurred;

a location information managing means for storing and managing contact addresses of visitor identifying and communicating terminals;

a visitor identifying and communicating proxy means for requesting a session connection to one of the visitor identifying and communicating terminals, selected by the resident, based on the contact addresses according to the detected location of the resident by the terminal recognizing means when the bell activation event is occurred, exchanging voice and image of the visitor and voice of the resident between the video door phone device and the selected terminal through a session channel connected by the resident's allowance of the session connection request, and releasing the session by a request of the selected terminal;

wherein each of the visitor identifying and communicating terminals includes:

a visitor communication terminal application controller for registering and updating location information of a terminal, transmitting and receiving a session initiation protocol (SIP) message, and processing a real-time transport protocol (RTP) packet;

a user interface processor for sensing and processing an event inputted from a user and interacting with the visitor communication terminal application controller; and a multimedia interface processor for encoding voice data inputted from a microphone, decoding received visitor's voice/image data, and outputting the decoded voice/image data.

2. The system for providing a service identifying a visitor and communicating a visitor as recited in claim 1, wherein the visitor identifying and communicating terminals includes a wireless communication terminal, the wireless communication terminal having:

the visitor communication terminal application controller for registering and updating location information of the terminal, transmitting and receiving the session initiation protocol (SIP) message, and processing the real-time transport protocol (RTP) packet;

the user interface processor for sensing and processing the event inputted from the user and interacting with the visitor communication terminal application controller;

the multimedia interface processor for encoding voice data inputted from the microphone, decoding received visitor's voice/image data, and outputting the decoded voice/image data; and a terminal recognition controller for processing a terminal recognition request message of the terminal recognizing means.

3. A method for providing a service identifying a visitor and communicating a visitor using a home network, comprising the steps of:

a) at a home gateway device, determining whether a resident is home or not through a message communication between a home gateway and the resident's wireless communication terminal in real time when a bell activation event is occurred by a visitor;

b) at the home gateway device, requesting a session connection to one of in-house visitor identifying and communicating terminals, selected by the resident, based on a contact address when the resident is home according to the determination of the step a);

c) at the home gateway device, transmitting an image of the visitor from the video door phone to a resident-selected visitor identifying and communicating terminal through a session channel established by the resident's allowance of the session connection request; and d) at the home gateway device, releasing the connected session by a request of the resident-selected visiting identifying and communicating terminal, wherein in the a), in order to determine whether the resident is home or not in real time through the message communication between the home gateway and the resident's wireless communication terminal, the wireless communication terminal dynamically updates a receiving IP address to the home gateway device based on an updating method when the wireless communication terminal moves among packet data servicing nodes (PDSN) in a wireless communication network, the updating method includes the steps of:

at a first packet data serving node (PDSN) having a plurality of address resources, allocating an internet protocol (IP) address to a wireless communication terminal connected to the first PDSN;

at the wireless communication terminal, registering a contact location to the home gate way device by using corresponding address information; and at the wireless communication terminal, updating a contact address of own by transmitting a location change request message to the home gate way device when the wireless communication terminal moves to an area covered by a second packet data serving node (PDSN) and the second PDSN allocates a new IP address to the wireless communication terminal.

4. The method for providing a service identifying a visitor and communicating a visitor using a home network as recited in claim 3, wherein the step c) further includes a step of: at the home gateway, transferring voice of the visitor and voice of the resident between the resident-selected visiting identifying and communicating terminal and the video door phone device through the session channel.

5. The method for providing a service identifying and communicating a visitor using a home network as recited in claim 3, further comprising the steps of:

e) at the home gateway device, activating a recording function according to a request of the resident-selected visiting identifying and communicating terminal;

f) at the home gateway device, outputting an announcement recorded according to a recording function setting to the video door phone device when the bell activation event is occurred by the visitor, and receiving and storing voice/image of the visitor from the video door phone device; and g) at the home gateway device, transmitting the stored voice/image of the visitor to the resident-selected visitor identifying and communicating terminal by the resident's request.

6. The method for providing a service identifying and communicating a visitor using a home network as recited in claim 3.

7. A method for providing a service identifying and communicating a visitor using a home network, the method comprising the steps of:

a) at a home gateway device, determining whether a resident is home or not in real time through a message communication between a home gateway and the resident's wireless communication terminal when a bell activation event is occurred by a visitor;

b) at the home gateway device, checking whether a contact address of out-house visitor identifying and communicating terminal is registered or not, and requesting a session connection to a contact address of the out-house visitor identifying and communicating terminal or a contact address of the wireless communication terminal when the resident is not home according to the determination of the step a);

c) at the home gateway device, transmitting an image of the visitor from the video door phone to a resident-selected terminal between the out-house visitor identifying and communicating terminal and the wireless communication terminal through a session channel established by the resident's allowance of the session connection request; and d) at the home gateway device, releasing the connected session by a request of the resident-sejected terminal wherein in the a), in order to determine whether the resident is home or not in real time through the message communication between the home gateway and the resident's wireless communication terminal, the wireless communication terminal dynamically updates a receiving IP address to the home gateway device based on an updating method when the wireless communication terminal moves among packet data servicing nodes (PDSN) in a wireless communication network, the updating method includes the steps of:

at a first packet data serving node (PDSN) having a plurality of address resources, allocating an internet protocol (IP) address to a wireless communication terminal connected to the first PDSN;

at the wireless communication terminal, registering a contact location to the home gate way device by using corresponding address information; and at the wireless communication terminal, updating a contact address of own by transmitting a location change request message to the home gate way device when the wireless communication terminal moves to an area covered by a second packet data serving node (PDSN) and the second PDSN allocates a new IP address to the wireless communication terminal.

8. The method for providing a service identifying and communicating a visitor using a home network as recited in claim 7, wherein the step c) further includes a step of: at the home gateway, transferring voice of the visitor and voice of the resident between the resident-selected terminal and the video door phone device through the session channel.

9. The method for providing a service identifying and communicating a visitor using a home network as recited in claim 7, further comprising the steps of:

e) at the home gateway device, activating a recording function according to a request of the resident-selected terminal;

f) at the home gateway device, outputting an announcement recorded according to a recording function setting to the video door phone device when the bell activation event is occurred by the visitor, and receiving and storing voice/image of the visitor from the video door phone device; and g) at the home gateway device, transmitting the stored voice/image of the visitor to the resident-selected terminal by the resident's request.

10. The method for providing a service identifying and communicating a visitor using a home network as recited in claim 7, wherein a contact location registering message, a update requesting message and responding message exchanged between the home gate way device and the wireless communication terminal are achieved based on a session initiation protocol register (SIP REGISTER) method.

\* \* \* \* \*